United States Patent [19]

Kosuda et al.

[11] Patent Number: 4,897,286
[45] Date of Patent: Jan. 30, 1990

[54] METHOD FOR PRODUCING CARBON FIBER REINFORCED THERMOPLASTIC RESIN PRODUCT

[75] Inventors: Hiroyuki Kosuda; Yasuhisa Nagata; Yoshihiro Endoh, all of Shizuoka, Japan

[73] Assignee: Toho Rayon Co., Ltd., Tokyo, Japan

[21] Appl. No.: 291,362

[22] Filed: Dec. 29, 1988

Related U.S. Application Data

[63] Continuation-in-part of Ser. No. 135,795, Dec. 21, 1987, abandoned.

[30] Foreign Application Priority Data

Dec. 20, 1986 [JP] Japan .................................. 61-302779
May 1, 1987 [JP] Japan .................................. 62-108442
Jun. 9, 1987 [JP] Japan .................................. 62-143916

[51] Int. Cl.[4] .............................................. B05D 3/06
[52] U.S. Cl. .................................... 427/44; 427/45.1; 427/214; 427/221; 427/375; 427/385.5; 427/407.1; 427/443.2
[58] Field of Search ................. 427/44, 45.1, 214, 221, 427/375, 385.5, 407.1, 443.2

[56] References Cited

FOREIGN PATENT DOCUMENTS 1424168 2/1976 United Kingdom .

Primary Examiner—Bernard Pianalto
Attorney, Agent, or Firm—Sughrue, Mino, Zinn, Macpeak & Seas

[57] ABSTRACT

A process for producing a product of carbon fiber reinforced thermoplastic resin comprising immersing carbon fibers in a suspension of a powder of a thermoplastic resin in a liquid medium, which contains at least 20 wt % of an organic liquid and which contains from 0 to 80 wt % water, to impregnate the thermoplastic resin among carbon fibers, and heating the thermoplastic resin deposited on the fibers to melt and form a unitary assembly with carbon fibers.

18 Claims, 1 Drawing Sheet

METHOD FOR PRODUCING CARBON FIBER REINFORCED THERMOPLASTIC RESIN PRODUCT

This is a continuation-in-part of application Ser. No. 07/135,795, filed Dec. 21, 1987, now abandoned.

FIELD OF THE INVENTION

The present invention relates to a method for producing a carbon fiber reinforced thermoplastic resin product (prepreg) comprising impregnating a thermoplastic resin in a strand of carbon fibers and subsequently heating the thermoplastic resin to be melted to form a product (prepreg) with the carbon fibers. The product obtained by the present invention offers a carbon fiber reinforced composite having improved impact resistance and other desired properties. This composite finds extensive use in aerospace applications and other industrial fields in general.

BACKGROUND OF THE INVENTION

Since carbon fibers have high specific strength and specific modulus of elasticity, they are used in a variety of resin materices in the form of long or short filaments to form fiber-reinforced composites. In aerospace applications that require high mechanical properties and heat resistance, and in other general industrial fields, thermosetting resins such as unsaturated polyester resins, epoxy resins and polyimide resins have been used as matrix resins. However, since these matrix resins are brittle and inferior in impact resistance, improvement thereof has been required, especially for use in aircraft.

Other problems with the conventional thermosetting resins are that prepregs made from them are difficult to store in good condition because of their short shelf life and that such prepregs lend themselves to have low production rate since they require a long time to be formed into a desired shape.

As compared with prepregs of thermosetting resins, those of thermoplastic resins have distinct advantages in that they can be formed into composites having improved impact resistance, that they are fairly easy to store in good conditions, and that they can be shaped into a desired form in a short period of time, thereby contributing to a lower shaping cost.

Commonly employed methods for producing prepregs of thermoplastic resins include: (1) hot-melt-adhering a film of thermoplastic resins to carbon fibers (described e.g., in Japanese Patent Application (OPI) No. 29651/83); (2) immersing a carbon fiber strand in an aqueous dispersion containing thermoplastic resin, particles, melting the resin particles and drying the carbon fiber strand (described e.g., in Brit. Patent 1,424,168); and (3) passing carbon fibers through a fluidized bed of a resin powder to have the resin deposited on the fibers and heating the resin to melt (described in e.g., U.S. Patent 3,742,106). However, these methods each has problems. In the first method since the resin does not permeate into the inside of the carbon fiber strand sufficiently their mechanical characteristics can not be obtained sufficiently. The second method has the disadvantage that spreadability of a carbon fiber is poor, which results in low impregnation of the resin into the carbon fiber strand. In the third method, it is difficult to control the amount of resin particles to be deposited on the carbon fibers.

The present inventors conducted studies in order to develop a process for producing a product of carbon fiber reinforced thermoplastic resin without suffering from the aforementioned problems of the prior art techniques.

SUMMARY OF THE INVENTION

An object of the present invention is to provide a method for producing a carbon fiber reinforced product. A second object of the present invention is to provide a product of a high-performance composite.

These objects of the present invention can be attained by immersing a carbon fiber strand in a suspension of a powder of a thermoplastic resin in a liquid medium, which contains at least 20 wt% of an organic liquid and which contains from 0 to 80 wt% water, to impregnate the thermoplastic resin, and heat-melting the thermoplastic resin to form a product of carbon fibers.

DETAILED DESCRIPTION OF THE INVENTION

Figure 1:
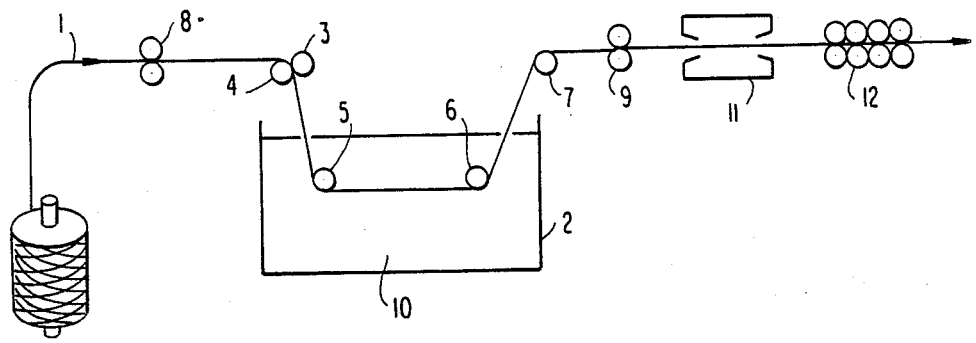
FIG. 1 shows an apparatus that may be employed to implement the process of the present invention.

In accordance with the present invention, the resin impregnates uniformly between each carbon fibers. The product prepared in this way has good mechanical properties or when the product is used as a prepreg it provides a carbon fiber reinforced composite material which exhibits good mechanical properties.

Carbon fibers used in the present invention preferably have a strength of at least 100 kgf/mm$^2$ and modulus of elasticity of at least $10 \times 10^3$ kgf/mm$^2$. Suitable carbon fibers usually have a diameter of from 1 to 20 μm, preferably from 4 to 7 μm. In the present invention carbon fibers may be in the form of a strand (which usually comprises of about 12,000 to about 10,000,000 filaments), a sheet comprising of the strands, or a fabric comprised of the strands (hereinafter these embodiments are collectively referred to as a strand).

In order to provide better adhesion to the resin, the fibers are preferably subject to a suitable surface teratment. Examples of the surface treatment include an oxidation treatment by electrolysis (described, e.g., in U.S. Pat. No. 4,401,533) or with an acid such as nitric acid or chromic acid (described e.g., in Japanese Patent Publication No. 27,000/72).

In the present invention either crystalline or noncrystalline resins can be used. The resin preferably has a melting point or, if the resin does not have a melting point, the resin preferably has glass transition temperature of not lower than 150° C. Examples of thermoplastic resins include polysulfones, polyethersulfones, polyetherketones, polyetheretherketones, aromatic polyamides, aromatic polyesters, polycarbonates (e.g., aromatic polycarbonates), polyetherimides, polyarylene oxides, polyamide, polyethylene terephthalate, polyphenylenesulfide, polyamideimide, polyarylate, and thermoplastic polyimides.

Two or more of these thermoplastic resins may be used as blends of desired proportions. By properly selecting two or more resins to use in combination superior shaping ability and physical properties can be obtained.

A resin having a higher melt viscosity may be blended together with a resin having a lower melt viscosity to improve their flow characteristics and this leads to the possibility of production of composite having a high-performance with few defects under comparatively low molding pressure. Therefore, the present invention can provide composite materials having satisfactory mechanical properties.

Thermoplastic resins must be in a powder form. In order to ensure good adhesion to the carbon fibers, the particles of the resin preferably have an average size of not more than 50 μm, with the value of 10 μm and below being particularly preferred. The particles preferably have an average size of not less than 1 μm in view of handling.

The liquid medium (or dispersion medium) that can be employed to make a suspension of the resin powder contains at least 20 wt%, preferably at least 60 wt%, of an organic liquid which is generally selected from among halogenated hydrocarbon compounds (e.g., dichloromethane, dichloroethane, chloroform, carbon tetrachloride, trichloroethane and trichloroethylene) and an organic liquid miscible with water, such as, alcohols (e.g., ethanol) and ketones (e.g., acetone), mixtures thereof and mixtures of water and at least one of the organic liquid miscible with water wherein the water constitutes from 0 to 80 wt%, preferably from 0 to 40 wt%, of the liquid medium. A suitable type of liquid medium should be selected in consideration of the type and amount of the resin used. Alcohols and ketones are preferable because impregnation of the resin can be easily conducted even if the resin concentration in the dispersion is low. When the liquid medium contains water in an amount of more than 80 weight % spreadability (separating fibers from each other to facilitate impregnation of resin into the strand) of carbon fibers is not thus the dispersion hardly impregnates into the carbon fiber strand. For example, ketones are preferably used as a dispersing medium for a polyetheretherketone from the point of view of impregnation of the resin into a carbon fiber strand.

In order to ensure proper control of the resin content in the final product (prepreg), the concentration of the thermoplastic resin in the suspension [thermplastic resin ×100/(dispersion medium + thermoplastic resin)] is advantageously adjusted to be within the range of from 1 to 50% (by weight) more preferably from 1 to 30%, and most preferably from 5 to 15%.

The carbon fibers may be either batchwise or continuously immersed in the resin suspension using rollers. Continuous operations are preferred in order to ensure efficient deep impregnation of the resin into the fiber strand.

The resin suspension may have any temperature within the range that ensures the formation of a uniform dispersion of resin particles. While this range depends on the type and concentration of the resin used, the range of from 5° to 50° C. is usually employed, preferably from 5° to 30° C., and more preferably from 15° to 25° C. The period of time of immersion in the resin solution must be varied in accordance with the amount of the resin to be impregnated in the fiber strand, and the voltage and current applied when a direct current is used. Usually, the carbon fibers are immersed in the resin solution for 5 to 180 seconds. The length of the bath for the suspension is usually at least 30 cm.

During the impregnation, the fiber strand are placed under a tension of such a degree that keeps the fiber strand taut without slackening to a value beyond which the fibers become fuzzy.

The amount of the resin particles deposited on carbon fibers of so treated fiber strands is 10 to 70 wt% (based on the weight of the thus treated fibers), but from the view point of prepreg fabrication, the resin particles are preferably deposited on the fibers in an amount of 20 to 50 wt%.

The thus-treated carbon fiber strand is usually dried at a temperature lower than that at which the resin undergoes reaction or decomposition. Usually, the drying is performed at 80° to 200° C. for 1 to 20 minutes.

The strand of the fibers to which the resin particles have adhered is subsequently passed over or between rollers heated to a temperature not lower than the glass transition point or melting point of the resin. Alternatively, the strand may be passed through slits surrounded by such a hot atmosphere. By this treatment, the resin is melted to form a unitary assembly with the fibers, to form a product or a prepreg of the carbon fiber reinforced thermoplastic resin. The product of the present invention can be subjected to repeated plastic working by applying pressure and heat to the product. A plurality of such products may be laid up, heated and shaped under pressure, usually using a mold.

According to the present invention the particles of the thermoplastic resin are effectively impregnated between fibers so as to provide a fiber strand in which the carbon fibers are uniformly imprengated with the resin. As a result, in the product produced by subsequent melting of the resin features a higher degree of uniformity in resin deposition and affords good adhesion between the fibers and the resin. Threrefore, when the product is used as a prepreg a composite having superior mechanical properties can be obtained.

An unsized carbon fiber strand has a tendency to be unduly spread and filaments easily separated from each other under an external force and hence it is difficult to handle during operations; a large amount of fuzz occurs during the production of a product (prepreg) due to frequent filament breakage and this leads to a low production rate; and the product finally obtained is fuzzy so that obtention of a product of an excellent appearance and high quality can not be guaranteed.

If a fiber strand in which the individual fibers are held together by a sizing agent (bundling agent) is used instead of an unsized fiber strand, the method of the present invention can not be conducted effectively to obtain a product having high qualities because the sizing agent prevents the fiber strand from being sufficiently spreaded to permit effective penetration of the particles of a thermoplastic resin into the fiber strand. Therefore, composite materials shaped from such a product, i.e., prepregs to be produced by the method of the present invention are unsatisfactory in their mechanical characteristics and fail to fully exploit the inherent properties of the reinforcing fibers and the resin.

In order to avoid such problems it is preferred to use a strand treated with a sizing agent and to use a solvent as a dispersion medium to dissolve away the sizing agent in the dispersion so that the impregnation of the resin particles is not impeded.

Examples of sizing agents include an epoxy resin which is conventionally used as disclosed in, for example, U.S. Pat. Nos. 4,420,512 and 4,474,906. If desired, a soluble polyamide, polyvinyl pyrrolidone or polyvinyl alcohol may be used as a sizing agent. The sizing agent is usually used in an amount of from 0.5 to 5.0 wt%, preferably from 0.5 to 2.0 wt% based on the combined weight of the carbon fibers and sizing agent.

The dispersion medium used to make a suspension of the resin powder to treat the carbon fiber strand having a sizing agent thereon should have the ability to dissolve away the sizing agent. A suitable dispersion medium is water, an alcohol, a ketone, a halogenated hydrocarbon compound or a mixture thereof. Illustrative alcohols include ethanol and methyl cellosolve; illustrative ketones include acetone and methyl ethyl ketone; and illustrative halogen compounds are methylene chloride and dichloroethane. The type of mediums having the ability to dissolve the sizing agent and the amount thereof are selected in accordance the type and amount of sizing agent used and with the temperature of the bath of resin solution. The medium should not swell or dissolve the thermoplastic resin powder dispersed therein.

In order to enhance the effects of the present invention, the powder of a thermoplastic resin may be impregnated and deposited on carbon fibers by electrophoretically, i.e., by applying a direct current between the suspension and carbon fibers immersed in the suspension. In order to ensure deep impregnation of the resin into the fiber strand it is preferable that a direct current applied pass only between the resin suspension and the fiber strand.

The concentration of the resin in the suspension also may vary with the voltage and current applied and the amount of the resin to be deposited on the fibers. The concentration ranges described hereinabove can also be applied hereto.

The electric current must be a direct current, and the fiber strand maybe used as an anode or a cathode and the electrode in the suspension being of the opposite polarity. If a polarizing thermoplastic resin is used, it is preferable to use the fiber strand as an anode and the electrode in the suspension as a cathode in order to deposit the resin uniformly on the fibers.

The voltage to be applied varies with the electrical resistance of the carbon fibers and the suspension in which they are immersed, but generally a voltage of at least 1 volt is applied. The current applied preferably has a current density of at least 1 milliampere per square meter of the surface area of filaments which form the carbon strand and which are situated in the bath within 1 meter from the feed end. A particularly preferred range is from 0.01 to 5 amperes per square meter.

The present invention is further described with reference to the accompanying Figures.

FIG. 1 shows an apparatus that may be employed in the present invention. In FIG. 1, the numeral 1 denotes a fiber strand, 2 is a bath containing a resin suspension, and 3–9 each signifies a roller. Numerals 10, 11 and 12 represent the resin suspension, a dryer and nip rollers, respectively.

The fiber strand 1 is unwound from a bobbin and introduced into the bath 2 through guide rollers 3 and 4. The bath 2 is filled with a resin suspension 10 which contains particles of at least one thermoplastic resin adjusted to a predetermined concentration. The fiber strand 1 is immersed in the resin suspension so that the resin particles are impregnated into the strand.

The fiber strand having the resin impregnated between individual fibers is taken out of the bath 2, dried with the dryer 11, and passed through the nip rollers 12 so that the resin is melted or softened and thermally impregnated in the strand to provide a product containing carbon fibers.

Figure 2:
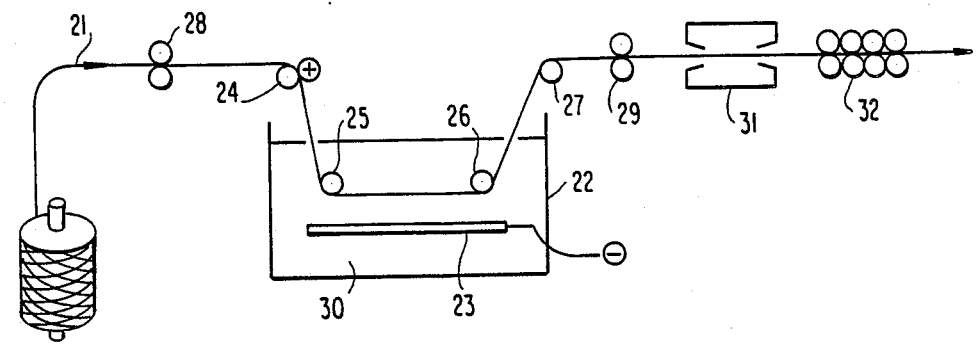
FIG. 2 shows an apparatus that may be used to electrophoretically deposit resin particles in the method of the present invention.
Figure 3:
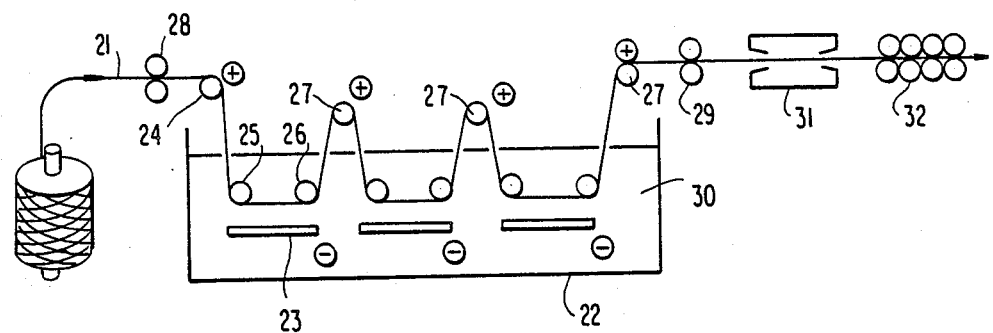
FIG. 3 shows an apparatus that may be employed in the present invention performing a multi-stage treatment.

An example of the apparatus employed in the present invention to deposit a thermoplastic resin electrophoretically is shown in FIG. 2, in which the numeral 21 denotes a fiber strand, 22 is an electrically insulated treating bath, 23 is an electrode which may be in the form of a plate, rod or net of a metallic material (e.g. copper) or a carbon material, and 24, 25, 26 and 27 are rollers. Each of the rollers 24 and 27 serves as a rotatable electrode for current application made of a conductive material such as a metal or a carbon material. Rollers 25 and 26 are electrically insulated rotatable guide rollers. Shown by 28 and 29 are a supply roller and a take up roller, respectively. The numeral 30 is a resin suspension, 31 is a dryer, and 32 is a unit of nip rollers. FIG. 3 shows an apparatus that may be employed in performing a multi-stage treatment. The numerals mean the same as those in FIG. 2. In performing a multi-stage treatment, a single treating bath may be employed as shown in FIG. 3 but two or more baths may also be used.

Multi-stage treatments are particularly effective to deposit particles on the carbon fibers uniformly and quickly.

The following examples are provided for the purpose of further illustrating the advantages of the present invention but are in no way to be taken as limiting.

EXAMPLES 1 AND 2

The powders of the thermoplastic resins shown in Table 1 were individually dispersed in a liquid mixture of ethanol and acetone (10:1 by weight) to prepare suspensions having the resin concentration shown in Table 1. Each of the suspensions was supplied into a bath having the layout shown in FIG. 1. A sheet having a width of 23 cm and comprising 40 carbon fiber strands (tensile strength: 420 kgf/mm$^2$; modulus of elasticity, 24,500 kgf/mm$^2$; diameter=7 μm; 12,000 filaments per strand; unsized; sheet is formed of 22,500 filaments per cm) was passed through the bath.

The resins were impregnated between the individual fibers by immersing them in the bath for the periods of time shown in Table 1. Subsequently, the fibers were dried at 150° C. for 10 minutes and thermally impregnated by passage through nip rollers held at the temperatures indicated in Table 1 giving the fiber strand impregnated with the resin a pressure of 1 Kg/cm$^2$, thereby producing unitary prepregs of unidirectional carbon fiber reinforced thermoplastic resin.

Each of the prepregs had fiber weight (aerial weight) of 150 g/m$^2$ and a resin content of 34 wt%. Each prepreg was cut to segments of a size as defined in ASTM. Twenty of such segments were laminated unidirectionally with respect to the direction of the carbon fibers, placed in a mold and molded under the conditions shown in Table 1 to fabricate a flat sheet. The volume fractions of the fibers in the so fabricated sheets are shown in Table 3. Test pieces were cut from each sheet and their bending characteristics (ASTM D-790) and interlaminar shear strength (ILSS) (ASTM D-2344) at 0° (with respect to the direction of the fiber) were measured. The results are shown in Table 3.

EXAMPLES 3–6

The powders of the thermoplastic resins shown in Table 1 were individually dispersed in a liquid mixture of ethanol and acetone (10:1 by weight) to prepare suspensions having the resin concentrations shown in Table 1. Each of the suspensions was supplied into a bath having the layout shown in FIG. 2. Thereafter, a sheet the same as defined in Examples 1 and 2 was passed through the bath. In these examples, a direct current was passed through the bath, with the carbon fibers being used as an anode and electrode 3 as a cathode, so that the resins would be firmly deposited on the carbon fiber sheet. The immersion time, voltage and current density conditions employed are shown in Table 1. Subsequently, the fibers were dried at 150° C. for 10 minutes and the resin was thermally impregnated by passing through nip rollers giving the fiber strand impregnated with the resin a pressure of 1 kg/cm$^2$, whereby unitary prepregs of unidirectional carbon fiber reinforced thermoplastic resins were produced.

Each of the prepregs had a fiber weight of 150 g/m$^2$ and a resin content of 35 wt%.

Test pieces were obtained and their bending characteristics and ILSS were measured in the same manner as in Examples 1 and 2. The results are summarized in Table 3.

COMPARATIVE EXAMPLE 1

The powder of the thermoplastic resin shown in Table 1 was charged into a bath having the layout shown in FIG. 1. The powder was not suspended in any dispersion medium such as alcohol and remained dry. Thereafter, a carbon fiber sheet as defined in Examples 1 and 2 was passed through the bath in the same manner as Examples 1 and 2. After the resin particles adhered to the carbon fiber bundles, the fibers were thermally impregnated with the resin by passage through nip rollers held at the temperature indicated in Table 1 giving the strand impregnated with the resin a pressure of 1 kg/cm$^2$, so as to produce a unitary prepreg of a unidirectional carbon fiber reinforced thermoplastic resin. This prepreg had fiber density of 150 g/m$^2$ and an average resin content of 35 wt%.

Test pieces were obtained and their bending characteristics and ILSS were measured in the same manner as Examples 1 and 2. The results are summarized in Table 3.

COMPARATIVE EXAMPLES 2 AND 3

Films of the resins identified in Table 2 were thermocompressed onto carbon fiber sheets the same as defined in Examples 1 and 2. The combinations were passed through nip rollers to effect thermal impregnation under the conditions shown in Table 2. Test pieces were obtained in the same manner as in Examples 1 and 2 using conditions shown in Table 2 and their bending characteristics and ILSS were measured in the same manner as in Examples 1 and 2. The results are shown in Table 3. The prepregs fabricated by merely hot melting resin films were poorly impregnated with the resins and the composites molded from these prepregs exhibited a lower performance than those produced in Examples 1–6.

TABLE 1

| | Thermoplastic resin powder | | Resin concentration in suspension (wt %) | Impregnation treatment | | | Temperature of nip rollers (°C.) | Coefficient of variation in resin content (%) | Molding conditions | | |
|---|---|---|---|---|---|---|---|---|---|---|---|
| | | Particle size of resin (μm) | | Voltage (V) | Current (A/m$^2$) | Treating time (sec) | | | Temperature (°C.) | Pressure (kg/cm$^2$) | Time (min) |
| Example 1 | Nylon 12 (Ato Chimie) | 20 | 20 | — | — | — | 260 | 5.0 | 260 | 25 | 30 |
| Example 2 | Polyether-*1 etherketone (Sumitomo Chemical | 10 | 20 | — | — | — | 380 | 4.2 | 380 | 50 | 30 |

TABLE 1-continued

|  | Thermoplastic resin powder | | Resin concentration in suspension (wt %) | Impregnation treatment | | | Temperature of nip rollers (°C.) | Coefficient of variation in resin content (%) | Molding conditions | | |
|---|---|---|---|---|---|---|---|---|---|---|---|
|  |  | Particle size of resin (μm) |  | Voltage (V) | Current (A/m²) | Treating time (sec) |  |  | Temperature (°C.) | Pressure (kg/cm²) | Time (min) |
| Example 3 | Nylon 12 (Ato Chimie) | 20 | 20 | 5 | 0.5 | 60 | 260 | 3.5 | 260 | 25 | 30 |
| Example 4 | Polyether-*1 etherketone (Sumitomo Chemical Co., Ltd.) | 10 | 10 | 5 | 0.5 | 60 | 380 | 2.8 | 380 | 50 | 30 |
| Example 5 | Polyether-*1 etherketone (Sumitomo Chemical Co., Ltd.) | 10 | 20 | 10 | 1.0 | 100 | 380 | 3.0 | 380 | 50 | 30 |
| Example 6 | Polyether-*2 sulfone (Sumitomo Chemical (Co., Ltd.) | 10 | 30 | 5 | 0.5 | 40 | 380 | 3.8 | 380 | 80 | 30 |
| Comparative Example 1 | Polyether-*2 sulfone (Sumitomo Chemical Co., Ltd.) | 10 | — | — | — | — | 380 | 15.0 | 380 | 80 | 30 |

TABLE 2

|  | Thermoplastic resin film | Temperature for thermal impregnation with nip rollers (°C.) | Molding conditions | | |
|---|---|---|---|---|---|
|  |  |  | Temperature (°C.) | Pressure (kg/cm²) | Time (min) |
| Comparative Example 2 | Nylon 12 (Ato Chimie) | 260 | 260 | 25 | 30 |
| Comparative Example 3 | Polyether-*3 etherketone (Sumitomo Bakelite Co., Ltd.) | 380 | 380 | 50 | 30 |

*1, *3 Polyetheretherketone

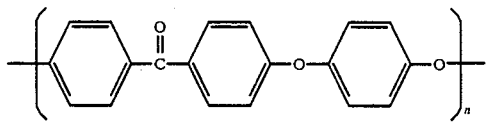

Tg: 143° C. Mp: 334° C.
(Tg: glass transition temperature)
*2 Polyethersulfone

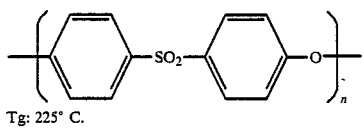

Tg: 225° C.

TABLE 3

| Example No. | Comparative Example No. | Flexural strength (kgf/mm²) | Flexural modulus of elasticity (kg/mm²) | ILSS (kgf/mm²) | Vf (vol %) |
|---|---|---|---|---|---|
| 1 |  | 155 | 13,500 | 10.0 | 60 |
| 2 |  | 160 | 13,400 | 10.0 | 60 |
| 3 |  | 160 | 12,300 | 10.5 | 58 |
| 4 |  | 170 | 13,800 | 11.0 | 65 |
| 5 |  | 170 | 12,500 | 11.0 | 60 |
| 6 |  | 165 | 12,200 | 10.5 | 58 |
|  | 1 | 150 | 12,400 | 9.8 | 59 |
|  | 2 | 140 | 12,200 | 8.5 | 58 |
|  | 3 | 155 | 12,200 | 9.2 | 57 |

(Note)
All measurements were conducted at 23° C.

EXAMPLES 7-16

The powders of two or more of the thermoplastic resins shown in Table 4-A were mixed at the concentrations also shown in Table 4-A, and the resulting mixtures were dispersed in the dispersion media noted in Table 4-B. By these procedures, resin suspensions were prepared.

Using these suspensions prepregs were obtained in the same manner as Examples 1 and 2.

Each of the prepregs had a fiber weight of 150 g/m² and a resin content of 34 wt%.

The state of dispersion of resin matrix in the prepregs was observed with a microscope and it was found that the resins were uniformly mixed together.

Test pieces were obtained in the same manner as in Examples 1 and 2. The volume fractions of the fibers in the so fabricated sheets are noted in Table 4-B.

Test pieces were cut from each sheet and their Charpy impact strengths and ILSS (measured in the same manner as in Examples 1 and 2) were measured. The results are shown in Table 1, from which one can see that the sheets obtained by using a mixture of resin provide better properties than those obtained by using single resin.

COMPARATIVE EXAMPLE 4

Two resin films were laminated to provide the same composition as employed in Example 7 and thermocompressed on a sheet as defined in Examples 1 and 2. The carbon fiber sheet was thermally impregnated by passage through nip rollers under the conditions shown in Table 4-B so as to produce an unidirectional prepreg for shaping.

Microscopic observation showed that the resin matrix consisted of an uneven blend of resins.

Test pieces were prepared from each of prepregs in the same manner as in Examples 1 and 2 and its Charpy impact strength and ILSS were measured in the same manner as hereinabove. The results are shown in Table 4-B. The prepreg fabricated by merely hot melting resin films was poorly impregnated with the resins and the composite molded from this intermediate exhibited a lower performance than those produced in Examples 7 and 8.

COMPARATIVE EXAMPLE 5

The powders of the thermoplastic resins shown in Table 4 and which would provide the same composition as employed in Example 7 were charged into a bath having the layout shown in FIG. 1. The powders were not suspended in any dispersion medium such as acetone and remained dry. Thereafter, a sheet of 40 carbon fiber bundles having the same characteristics as those employed in Examples 7 and 8 was passed through the bath. After the resin particles adhered to the carbon fiber strands, the fibers were thermally impregnated with the resins by passage through nip rollers held at the temperature indicated in Table 4, so as to produce a prepreg.

This prepreg had fiber weight of 150 g/m² and an average resin content of 35 wt%.

Microscopic observation showed that the resin matrix in this prepreg consisted of a uniform blend of resins. However, this intermediate was not satisfactory as a prepreg of fiber reinforced composite because of poor impregnation of carbon fibers with the resins.

The prepreg was cut to segments of a predetermined size as in Examples 1 and 2. Twenty of such segments were laminated one on top of another, placed in a mold, and shaped under the conditions shown in Table 4, so as to fabricate a flat sheet.

Test pieces were cut from the sheet and their Charpy impact strength and ILSS were measured as hereinabove. The results are summarized in Table 4. Because of insufficient impregnation of fibers with the resins, the composite molded from this prepreg exhibited a lower performance than those produced in Examples 7 and 8.

COMPARATIVE EXAMPLE 6

An attempt was made to fabricate a prepreg for the shaping of carbon fiber reinforced resin composite by employing a solution of thermoplastic resins selected to provide the same composition as employed in Example 7. However, no solvent was available that was capable of completely dissolving the selected thermoplastic resins and no satisfactory prepreg could be obtained.

TABLE 4-A

|  |  | Examples |  |  |  |  |  |  |
|---|---|---|---|---|---|---|---|---|
|  |  | 7 | 8 | 9 | 10 | 11 | 12 | 13 |
| Resin formulation | Polyetheretherketone*1 (7 μm) | 80 | 70 | 40 | 40 | 40 | — | — |
|  | Polyethersulfone*2 (25 μm) | — | 10 | — | — | 10 | — | 20 |
|  | Polyetherimide*4 (15 μm) | 20 | — | — | 10 | — | — | — |
|  | Polysulfone*5 (20 μm) | — | 10 | — | — | — | 10 | 10 |
|  | Polyetherketone*6 (10 μm) | — | — | — | — | 40 | 10 | — |
|  | Polyphenylenesulfide*7 (6 μm) | — | — | — | 10 | — | 70 | — |
|  | Polyamidoimide*8 (3 μm) | — | — | — | 10 | — | — | 70 |
|  | Nylon 12 (15 μm) | — | — | 20 | — | — | 10 | — |
|  | Polycarbonate*9 (20 μm) | — | 10 | — | — | 10 | — | — |
|  | Polyimide*10 (9 μm) | — | — | — | 30 | — | — | — |
|  | Polyarylate*11 (10 μm) | — | — | 40 | — | — | — | — |

|  |  | Examples |  |  | Comparative Examples |  |  |
|---|---|---|---|---|---|---|---|
|  |  | 14 | 15 | 16 | 4 | 5 | 6 |
| Resin formulation | Polyetheretherketone*1 (7 μm) | 10 | 100 | — | 80 | 80 | 80 |
|  | Polyethersulfone*2 (25 μm) | — | — | — | — | — | — |
|  | Polyetherimide*4 (15 μm) | 10 | — | — | 20 | 20 | 20 |
|  | Polysulfone*5 (20 μm) | — | — | — | — | — | — |
|  | Polyetherketone*6 (10 μm) | — | — | — | — | — | — |
|  | Polyphenylenesulfide*7 (6 μm) | 10 | — | — | — | — | — |
|  | Polyamidoimide*8 (3 μm) | — | — | 100 | — | — | — |
|  | Nylon 12 (15 μm) | — | — | — | — | — | — |
|  | Polycarbonate*9 (20 μm) | — | — | — | — | — | — |
|  | Polyimide*10 | 70 | — | — | — | — | — |

TABLE 4-A-continued

| | | | | | | | (9 μm) |
|---|---|---|---|---|---|---|---|
| Polyarylate*11 | — | — | — | — | — | — |

TABLE 4-A-continued

| | (10 μm) |
|---|---|

TABLE 4-B

| | | Examples | | | | | | |
|---|---|---|---|---|---|---|---|---|
| | | 7 | 8 | 9 | 10 | 11 | 12 | 13 |
| Production of Prepregs for molding | Process | ① | ① | ① | ① | ① | ① | ① |
| | Dispersion | acetone | acetone/ethanol | acetone | acetone/MEK | MEK/ethanol/water | MEK/methanol | methanol |
| | Resin concentration in suspension (wt %) | 8 | 10 | 8 | 7 | 15 | 10 | 15 |
| | Temperature for heating to produce unitary assembly (°C.) | 380 | 370 | 370 | 370 | 370 | 350 | 380 |
| | Quality Mixing of resins in matrix | good uniform | good uniform | good uniform | good uniform | good uniform | good uniform | good uniform |
| Composite molding | Molding temperature (°C.) | 380 | 380 | 380 | 380 | 380 | 350 | 380 |
| | Molding pressure (kg/cm²) | 6 | 6 | 6 | 6 | 6 | 6 | 20 |
| Properties of composite | 0° ILSS AI 23° C. (kgf/mm²) | 12 | 11 | 11 | 12 | 12 | 11 | 12 |
| | Charpy impact strength without edgewise notch (kgf/mm²) | 190 | 200 | 210 | 190 | 200 | 180 | 180 |

| | | Examples | | | Comparative Examples | | |
|---|---|---|---|---|---|---|---|
| | | 14 | 15 | 16 | 4 | 5 | 6 |
| Production of Prepregs for molding | Process | ① | ① | ① | ② | ③ | ④ |
| | Dispersion | MEK | acetone | methanol | — | — | — |
| | Resin concentration in suspension (wt %) | 6 | 8 | 15 | — | — | — |
| | Temperature for heating to produce unitary assembly (°C.) | 350 | 380 | 380 | 380 | 380 | — |
| | Quality Mixing of resins in matrix | good uniform | good uniform | good uniform | good not uniform | poor uniform | could not be produced |
| Composite molding | Molding temperature (°C.) | 350 | 380 | 380 | 380 | 380 | — |
| | Molding pressure (kg/cm²) | 15 | 6 | 20 | 6 | 6 | — |
| Properties of composite | 0° ILSS AI 23° C. (kgf/mm²) | 11 | 10 | 7 | 8 | 9 | — |
| | Charpy impact strength without edgewise notch (kgf/mm²) | 190 | 160 | 140 | 130 | 160 | — |

Note 1: The proportions of resins are expressed in terms of weight percent.
Note 2: The average particle size of each thermoplastic resin is shown in brackets.
Note 3: The numerals assigned to the respective processes for the production of prepregs have the following meanings: (1) method using a resin suspension; (2) method using resin films; (3) method using a bed of resin powders; (4) method using a solution of resins.
Note 4: MEK shows methyl ethyl ketone

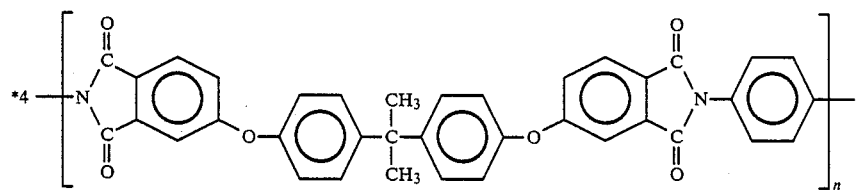

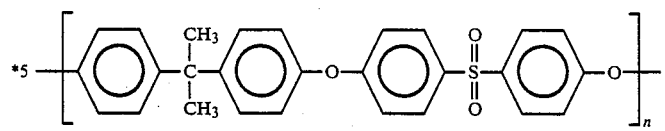

TABLE 4-B-continued

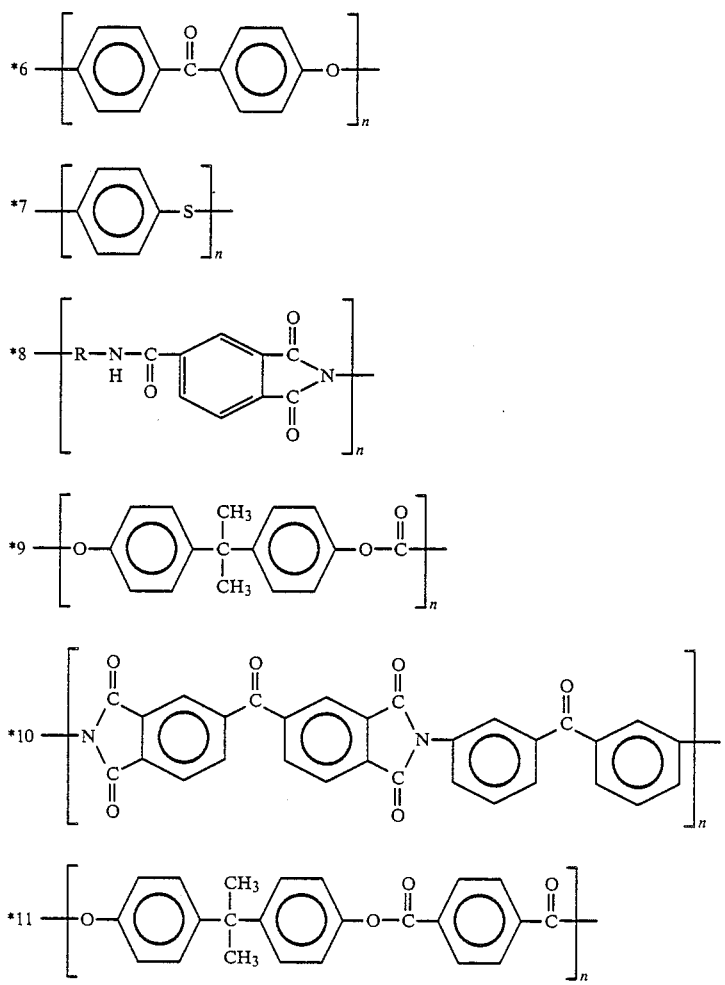

Note 1: The proportions of resins are expressed in terms of weight percent.

Note 2: The average particle size of each thermoplastic resin is shown in brackets.

Note 3: The numerals assigned to the respective processes for the production of prepregs have the following meanings: (1) method using a resin suspension; (2) method using resin films; (3) method using a bed of resin powders; (4) method using a solution of resins.

Note 4: MEK shows methyl ethyl ketone

EXAMPLES 17-18 AND COMPARATIVE EXAMPLES 7-14

The powder of a polyetheretherketone resin the same as in Example 2 (particle size, 5 μm) was deposited on carbon fibers by the five methods outlined in Table 5. In each of these methods, carbon fiber strands the same as used in Example 1 were treated either in the absence of a sizing agent or after the fibers were held together with an epoxy resin based sizing agent (bisphenol A type epoxy resin) at a loading of 1.0 wt%. The quantity of fuzz in the process of impregnation and the number of troubles (the stopping times of the operation) occurring during the operation of production of the prepreg are shown in Table 5. As is clear from the results shown in Table 5, fuzz formed on the prepreg and the number of troubles occurred during the operation in Examples 17 and 18 were much smaller than those of Comparative Examples 7-14. Furthermore by comparing the results of Examples 17 and 18 it can be recognized that when the carbon fiber strand treated with a sizing agent was used in the present invention more improved results than those of the carbon fiber strand not treated with a sizing agent were obtained.

EXAMPLES 19 AND 20

The powders of a polyetheretherketone resin the same as used in Example 2 and a polyamideimide powder the same as used in Example 10 were suspended in the dispersion mediums shown in Table 6 and the concentrations of resins in the resulting suspensions were adjusted to the values also shown in Table 6.

After each of the suspensions was charged in a bath having the layout shown in FIG. 1, a sheet (as defined in Example 1) of which carbon fiber strand being sized with an epoxy resin (bisphenol A type epoxy resin) based sizing agent was passed through the bath (25° C.).

After predetermined amounts of the resin particles were deposited on the sheet of carbon fibers, the strand was dried at 150° C. for 10 minutes and thermally impregnated by passing through nip rollers (1 kg/cm²)

that were held at the temperatures indicated in Table 6, thereby producing unitary prepregs of unidirectional carbon fiber reinforced thermoplastic resin.

Each of the prepregs had fiber weight of 150 g/m² and a resin content of 34%. Each prepreg was obtained under the conditions shown in Table 6, was cut to segments of test pieces, in the same manner as Example 1. The volume fractions of the fibers in the so fabricated pieces are shown in Table 7. Test pieces were subjected to measuring bending characteristics and interlaminar shear strength. The results are shown in Table 7.

EXAMPLE 21

Prepregs were produced as in Example 20 except that the carbon fibers in strands were not sized with a sizing agent. The specific conditions of production of prepregs and the characteristics of the shaped sheet are shown in Table 6 and 7, respectively.

COMPARATIVE EXAMPLES 15 AND 16

Films of the resins shown in Table 6 were thermocompressed onto the sheets in the same manner as in Example 19. The combinations were passed through nip rollers (1 kg/cm²) to effect thermal impregnation under the conditions shown in Table 6. Test pieces were obtained under the conditions shown in Table 6 and their bending characteristics and ILSS were measured in the same manner as in Example 1. The results are shown in Table 7. The prepregs that were fabricated by merely hot melting resin films were poorly impregnated with the resins and the composites molded from these prepregs exhibited a lower performance than those produced in Examples 19 and 20.

COMPARATIVE EXAMPLES 17-20

The powder of a polyetheretherketone (the same as used in Example 2; particle size, 5 μm) was deposited on sheets the same as used in Example 1 (unsized with a sizing agent). The deposition methods employed were the first four of the methods described in Table 5. The carbon fiber sheets were then thermally impregnated by passage through nip rollers (1 kg/cm²) held at the temperature indicated in Table 6, so as to produce unitary prepregs of unidirectional carbon fiber reinforced thermoplastic resins.

Each of the prepregs thus produced had fiber weight of 150 g/m² and a resin content of 35 wt%. Each prepreg was cut to segments of a predetermined size. Test pieces were produced in the same manner as in Example 1 under the conditions shown in Table 6. The volume fractions of the fibers in the so fabricated sheets are shown in Table 7. Test pieces were subjected to measuring bending characteristics and interlaminar shear strength as in example 1. The results are summarized in Table 7.

TABLE 5

| Method of depositing resin particles | | Sizing agent | Fuzz value (μg/m)* | Number of troubles per hour |
|---|---|---|---|---|
| Passing fiber strand through a bed containing a resin powder | Comparative Example 7 | absent | 1650 | 8 |
| | Example 8 | present | 660 | 4 |
| Bringing fiber strand into contact with a resin powder under vibration | Example 9 | absent | 1485 | 6 |
| | Example 10 | present | 643 | 3 |
| Spraying fiber strand with an electrically charged resin powder | Example 11 | absent | 1320 | 5 |
| | Example 12 | present | 561 | 2 |
| Fluidizing a resin powder under a gas stream and contacting with fiber strand | Example 13 | absent | 1320 | 4 |
| | Example 14 | present | 561 | 2 |
| Immersing fiber strand in a suspension of resin powder in liquid | Example 17 | absent | 3300 | 1 |
| | Example 18 | present | 82 | 0 |

*"Fuzz value" indicates the amount of fuzz retained on guides.

TABLE 6

| Example | Comparative Example | Sizing Agent | Thermoplastic resin powder | particle size (μm) | Resin suspension dispersion medium | resin concentration (wt. %) | Temperature of nip rollers (°C.) | Molding conditions temperature (°C.) | Pressure (kg/cm²) | time (min) | Smoothness of prepregging operation Fuzz (μg/m) | Number of troubles (per hr) |
|---|---|---|---|---|---|---|---|---|---|---|---|---|
| 17 | | absent | polyetheretherketone *1 | 5 | acetone | 10 | 380 | 380 | 40 | 30 | 330 | 1 |
| 19 | | present | polyetheretherketone *1 | 5 | acetone | 10 | 380 | 380 | 40 | 30 | 82 | 0 |
| 21 | | absent | polyamideimide*8 | 10 | methylene chloride | 15 | 350 | 350 | 80 | 30 | 429 | 2 |
| 20 | | present | polyamideimide*8 | 10 | methylene chloride | 15 | 350 | 350 | 80 | 30 | 99 | 0 |
| | 15 | absent | nylon 12 | — (film) | resin film hot-melted | | 260 | 260 | 25 | 30 | 396 | 2 |
| | 16 | absent | polyetheretherketone *3 | — (film) | resin film hot-melted | | 380 | 380 | 50 | 30 | 313 | 1 |
| | 17 | absent | polyetheretherketone *1 | 5 | as in Comparative Example 7 | | 380 | 380 | 40 | 30 | 1650 | 8 |
| | 18 | absent | polyetheretherketone *1 | 5 | as in Comparative Example 9 | | 380 | 380 | 40 | 30 | 1485 | 6 |
| | 19 | absent | polyetherethereketone *1 | 5 | as in Comparative Example 11 | | 380 | 380 | 40 | 30 | 1320 | 5 |
| | 20 | absent | polyetheretherketone | 5 | as in Comparative | | 380 | 380 | 40 | 30 | 1320 | 4 |

TABLE 6-continued

| Example | Comparative Example | Sizing Agent | Thermoplastic resin powder | particle size (μm) | Resin suspension dispersion medium | Resin suspension resin concentration (wt. %) | Temperature of nip rollers (°C.) | Molding conditions temperature (°C.) | Molding conditions Pressure (kg/cm²) | Molding conditions time (min) | Smoothness of prepregging operation Fuzz (μg/m) | Smoothness of prepregging operation Number of troubles (per hr) |
|---|---|---|---|---|---|---|---|---|---|---|---|---|
| | | | ketone *1 | | | Example 13 | | | | | | |

TABLE 7

| | Example | | | | Comparative Example | | | | | |
|---|---|---|---|---|---|---|---|---|---|---|
| | 17 | 19 | 21 | 20 | 14 | 15 | 16 | 17 | 18 | 19 |
| Flexural strength (kgf/mm²) | 173 | 175 | 168 | 170 | 140 | 155 | 155 | 156 | 160 | 160 |
| Flexural modulus of elasticity (× 10³ kgf/mm²) | 13.2 | 13.5 | 12.8 | 12.8 | 12.8 | 12.6 | 12.5 | 12.6 | 13.0 | 13.1 |
| ILSS (kgf/mm²) | 12.2 | 12.0 | 11.1 | 11.0 | 8.5 | 9.2 | 9.5 | 9.6 | 9.8 | 10.0 |
| Volume fraction of fibers (vol %) | 60 | 62 | 56 | 55 | 58 | 57 | 56 | 57 | 58 | 60 |
| Appearance of prepreg | B | A | B | A | C | C | C | C | C | C |

Note:
The appearance of a prepreg was rated "A" when it was free from any fuzz, rated "B" when it had very few fuzz of short filaments on its surface, and rated "C" when it had the fuzz in such an extent that the appearance of the prepreg is deteriorated.

EXAMPLES 22 TO 27 AND COMPARATIVE EXAMPLES 20 TO 22

Resin products were produced in the same manner as in Example 1 except materials and conditions were changed as shown in Table 8. Characteristics of the products are shown in Table 9.

TABLE 8

| Thermoplastic resin | Comparative Example 20 Nylon 12 | Comparative Example 21 Nylon 12 | Example 22 Nylon 12 | Example 23 Nylon 12 | Comparative Example 22 Polyetheretherketone | Example 25 Polyetheretherketone | Example 26 Polyetheretherketone | Example 27 Polyetheretherketone |
|---|---|---|---|---|---|---|---|---|
| Resin particle diameter (μm) | 10 | 10 | 10 | 10 | 10 | 10 | 10 | 10 |
| Amount of the resins (wt. %) | 20 | 20 | 20 | 20 | 10 | 10 | 10 | 10 |
| Suspension medium (weight ratio) | $H_2O$ | $H_2O$ | $H_2O$ acetone (80/20) | Acetone | $H_2O$ | $H_2O$ acetone (80/20) | ethanol acetone (90/10) | $H_2O$ ethanol (80/20) |
| Thickening agent | Sodium polyacrylate | — | — | — | Polyethylene oxide | — | — | — |
| Viscosity of the medium containing the thickening agent (CPS) | 1,200 | 1.0 | 0.9 | 0.3 | 400 | 0.9 | 1.0 | 1.1 |
| Viscosity of the suspension (CPS) | 8,000 | Suspension was unstable | 6,000 | 800 | 7,000 | 5,500 | 2,000 | 6,000 |
| Temperature of impregnation (°C.) | 25 | 25 | 25 | 25 | 25 | 25 | 25 | 25 |
| Time for impregnation (minute) | 3 | 3 | 2 | 0.5 | 3 | 2 | 1 | 2 |
| Removed medium liquid by squeezing (wt. %) | 80 | —* | 80 | 80 | 90 | 90 | 90 | 90 |
| Drying temperature × time (°C. × minute) | 150 × 10 | 150 × 10 | 150 × 10 | 150 × 10 | 150 × 10 | 150 × 10 | 150 × 10 | 150 × 10 |
| Temperature of nip rollers (°C.) | 260 | 260 | 260 | 260 | 380 | 380 | 380 | 380 |

*Squeezing could not be conducted (Since the suspension impregnated in the strand is present only near the surface of the strand, i.e., penetration of the suspension is not deeper toward the strand's core, the necessary amount of suspension would not remain in the strand if squeezing were to be conducted).

TABLE 9

| | Comparative Example 20 | Comparative Example 21 | Example 22 | Example 23 | Comparative Example 22 | Example 25 | Example 26 | Example 27 |
|---|---|---|---|---|---|---|---|---|
| Resin content (wt. %) | 32 | 25 | 36 | 40 | 32 | 34 | 34 | 32 |
| Impregnating ability** | X | X | U | U | X | U | U | U |
| Molding temperature × time ((°C. × minute) | 260 × 3 | 260 × 3 | 260 × 3 | 260 × 3 | 380 × 15 | 380 × 15 | 380 × 15 | 380 × 15 |

TABLE 9-continued

| | Comparative Example 20 | Comparative Example 21 | Example 22 | Example 23 | Comparative Example 22 | Example 25 | Example 26 | Example 27 |
|---|---|---|---|---|---|---|---|---|
| Molding pressure (kg/cm$^2$) | 15 | 15 | 15 | 15 | 15 | 15 | 15 | 15 |
| Voids in molding*** | > | > | < | < | > | < | < | < |
| Flexural strength (kgf/mm$^2$) | 145 | 140 | 155 | 160 | 145 | 170 | 170 | 160 |
| Flexural modulus of alasticity ($\times 10^3$ kgf/mm$^2$) | 13.0 | 15.5 | 13.5 | 13.2 | 13.0 | 13.4 | 13.5 | 13.2 |
| ILSS (kgf/mm$^2$) | 8.7 | 7.6 | 10.0 | 10.0 | 8.7 | 11.0 | 11.0 | 11.0 |
| Volume fraction of fibers (vol %) | 60 | 75 | 60 | 58 | 60 | 60 | 60 | 60 |

**A section of the strand which was subjected to heating to melt the resin observed by a microscope.
X: Resin particles exist only near the surface of the strand; penetration is not deeper towards the strand's core.
U: Resin particles exist uniformly in the strand.
***>: Voids constitute more than 2% of the molding.
<: Voids constitute less than 2% of the molding.

As can be seen in Table 9, when water is used as a suspension medium a resin product having high mechanical characteristics cannot be obtained. From the results it is clear that the liquid medium used for the suspension should contain at least 20wt%, preferably at least 60 wt%, of an organic liquid in order to obtain a resin product having high mechanical characteristics.

Furthermore, it also can be seen that when a liquid medium containing at least 20 wt% of organic liquid is used the required time for impregnation is very short.

What is claimed is:

1. A process for producing a product of carbon fiber reinforced thermoplastic resin comprising immersing carbon fibers in a suspension of a powder of a thermoplastic resin in a liquid medium, which contains at least 20 wt% of an organic liquid which contains from 0 to 80 wt% water, to impregnate the thermoplastic resin among the carbon fibers, and heating the thermoplastic resin deposited on the fibers to melt and form a unitary assembly with carbon fibers.

2. A process according to claim 1, wherein the carbon fibers are immersed in the suspension in a form of a strand, a sheet comprising of strands or a fabric comprised of strands.

3. A process according to claim 2, wherein the strand comprises of from 12,000 to 10,000,000 filaments.

4. A process according to claim 1, wherein the carbon fibers have a diameter of from 1 to 20 μm.

5. A process according to claim 1, wherein the carbon fibers have a strength of at least 100 kgf/mm$^2$ and a modulus of elasticity of at least $10 \times 10^3$ kgf/mm$^2$.

6. A process according to claim 1, wherein the thermoplastic resin is a resin selected from the group consisting of polysulfones, polyethersulfones, polyetherketones, polyetheretherketones, aromatic polyamides, aromatic polyesters, polycarbonates, polyetherimides, polyarylene oxides, polyamide, polyethylene terephthalate, polyphenylenesulfide, polyamideimide, polyallylate and thermoplastic polyimides.

7. A process according to claim 1, wherein the thermoplastic resin is a mixture of at least two kind of thermoplastic resin.

8. A process according to claim 1, wherein the powder of the thermoplastic resin comprises particles having a size of not more than 50 μm.

9. A process according to claim 1, wherein the suspension contains the thermoplastic resin in an amount of from 1 to 50 wt% based on the total weight of suspension.

10. A process according to claim 1, wherein the liquid medium contains at least 60 wt% of an organic liquid.

11. A process according to claim 1, wherein the amount of the resin particles deposited on carbon fibers is 10 to 70 wt% based on the weight of the thus treated carbon fibers.

12. A process according to claim 1, wherein the carbon fiber is treated with a sizing agent and the liquid employed to make the suspension is a solvent for sizing agent.

13. A process according to claim 12, wherein the amount of the sizing agent on carbon fibers is from 0.5 to 5.0 wt% based on the combined weight of the carbon fibers and sizing agent.

14. A process according to claim 12, wherein said sizing agent is an agent selected from the group consisting of an epoxy resin, a soluble polyamide, a polyvinyl pyrrolidone and a polyvinylalcohol.

15. A process according to claim 1, wherein the powder is impregnated and deposited on the carbon fibers by applying a direct current between the suspension and carbon fibers immersed in the suspension.

16. A process according to claim 1, wherein the organic liquid is selected from the group consisting of (i) a halogenated hydrocarbon compound and (ii) an organic liquid which is miscible with water.

17. A process according to claim 16, wherein said organic liquid which is miscible with water is a compound selected from the group consisting of an alcohol and a ketone.

18. A process according to claim 1, wherein said thermoplastic resin has a melting point or glass transition temperature (if the resin does not have melting point) of not lower than 150° C.

* * * * *